United States Patent Office 3,684,742
Patented Aug. 15, 1972

3,684,742
PROCESS FOR PREPARING A SILICA-ALUMINA SUPPORTED PLATINUM GROUP METAL HYDROCRACKING CATALYST
Ernest L. Pollitzer, Skokie, Ill., assignor to Universal Oil Products Company, Des Plaines, Ill.
No Drawing. Filed Dec. 17, 1969, Ser. No. 885,972
Int. Cl. B01j 11/40
U.S. Cl. 252—455 R                    4 Claims

ABSTRACT OF THE DISCLOSURE

A catalyst composition and method of manufacture. The catalyst composition comprises a platinum group metallic component on a silica-alumina carrier material. The catalyst is prepared to comprise a platinum group metallic component dispersed on the carrier material in a crystallite size of less than about 20 angstroms.

---

This invention relates to the conversion of petroleum hydrocarbon fractions by hydrocracking methods and, in particular, to an improved catalyst composition with respect thereto. Hydro-cracking relates to the cracking of petroleum hydrocarbon fractions in the presence of hydrogen at hydrocracking conditions whereby, in contrast to conventional cracking, the lower boiling products of the reaction are substantially more saturated than would be the case in the absence of added hydrogen or a suitable precursor thereof. Although hydrocracking can be accomplished thermally, the preferred processing techniques utilize a catalyst composite comprising an acidic cracking component and a hydrogenation component. Composites of silica and alumina are generally recognized as a most suitable acid-acting cracking component. The present invention is particularly directed to a hydrocracking catalyst composition wherein a platinum group metallic component is employed as the hydrogenation component of the catalyst composition.

In the manufacture of said catalyst comprising a platinum group metallic component, it has heretofore been the practice to calcine the catalyst composition in an oxidizing atmosphere at a temperature in excess of about 1100° F., usually at a temperature in the range of from about 1100° F. to about 1700° F. It has now been found that when the carrier material comprises the aforesaid silica-alumina cracking component, the carrier material exerts a peculiar influence on the platinum group metallic component. Thus, it has been observed that when the carrier material comprises silica composited with alumina, calcination in an oxidizing atmosphere at a temperature in the aforesaid range effects an agglomeration of a major portion of the platinum group metallic component on the carrier surface, the agglomeration being of a crystallite size in excess of about 40 angstroms. It will be appreciated that a platinum group metallic component dispersion substantially equivalent to an atomically dispersed metal would provide an optimum exposure of the platinum group metallic component to a reactant stream. Conversely, as the platinum group metallic component clusters or agglomerates into a larger crystallite size, the platinum group metallic component available for contact with a reactant stream is substantially reduced.

It is an object of this invention to present an improved catalyst composition comprising a platinum group metallic component dispersed on a silica-alumina carrier material in a crystallite size of less than about 20 angstroms. It is a further object to present a novel method of preparing said catalyst composition. It is a still further object to present a process for converting hydrocarbonaceous materials into lower boiling hydrocarbon fractions in contact with said catalyst composition at hydrocracking conditions.

In one of its broad aspects, the present invention embodies a catalyst composition comprising a platinum group metallic component composited with a silica-alumina carrier material and prepared by the method which comprises compositing at least one platinum group metallic component with a silica-alumina carrier material, and calcining the composite in an oxidizing atmosphere at a temperature of from about 750° to about 850° F. and recovering a catalyst composition comprising said metallic component dispersed on said carrier material in a crystallite size of less than about 20 angstroms.

Another embodiment of this invention is in a process for converting hydrocarbonaceous materials into lower boiling hydrocarbon fractions which comprises reacting said hydrocarbonaceous materials with hydrogen at hydrocracking conditions in the presence of the above described catalyst, said hydrocracking conditions including a hydrogen pressure of from about 800 to about 3000 pounds per square inch gauge, and a temperature of from about 350° to about 800° F.

Other objects and embodiments of this invention will become apparent in the following detailed specification.

In the present specification and appended claims, the term "hydrocarbonaceous materials" is intended to include the various petroleum hydrocarbon fractions and/or distillates and the various straight-chain and branched-chain, saturated and unsaturated, naphthenic and aromatic, hydrocarbon components thereof. Hydrocracking is generally applicable to the conversion of higher boiling petroleum fractions, i.e., those petroleum fractions boiling in the middle distillate range of from about 400° to about 700° F., to form substantial yields of petroleum hydrocarbons boiling below about 450° F., and including gasoline boiling range hydrocarbons. The catalyst composition of this invention is particularly effective in the conversion of said hydrocarbonaceous materials to liquid petroleum gas comprising saturated hydrocarbons in the $C_3$–$C_4$ range and in demand in certain geographical areas as domestic and industrial fuels. Thus, higher boiling petroleum fractions including kerosine and gas oil fractions, lubricating and white oil stocks, cycle stocks, and higher boiling materials such as are recovered as fractionator bottoms from conventional catalytic cracking operations, are readily converted to liquid petroleum gas comprising propane, n-butane, iso-butane, etc.

The catalyst composition with which the present invention is concerned comprises a platinum group metallic component on a silica-alumina carrier material. Generally, the silica-alumina carrier material will comprise from about 10 to about 90 wt. percent silica. Silica-alumina composites comprising 88 wt. percent silica and 12 wt. percent alumina, 75 wt. percent silica and 25 wt. percent alumina, and 65 wt. percent silica and 35 wt. percent alumina, are frequently employed. The platinum group metallic component is typically platinum or palladium, although other platinum group metals including ruthenium, rhodium, osmium and/or iridium are applicable. The platinum group metal is suitably employed in an amount to comprise from about 0.1 to about 5 wt. percent of the final catalyst composition.

The silica-alumina composites employed as carrier material are the products of well-known manufacturing procedures. The silica-alumina may be prepared and utilized as spheres, pills, pellets, extrudates, granules, etc. In a particularly preferred method of manufacture, an aqueous water glass solution, diluted to a silica concentration of from about 5 to about 15 wt. percent, is acidified with hydrochloric acid or other suitable mineral acid. The resulting sol is acid aged at a pH of from about 4 to about 4.8 to form a hydrogel, and the hydrogel is further aged at a pH of from about 6.5 to about 7.5. The silica hydrogel is then thoroughly impregnated with an aqueous aluminum salt solution, e.g., aluminum sulfate, of sufficient concentration to provide a desirable alumina content in the silica-alumina product. Alumina is then precipitated at a pH of about 8 by the addition of basic precipitating agent, suitably aqueous ammonium hydroxide. The silica-alumina, which exists as a hydrogel slurried in a mother liquor, is recovered by filtration, water-washed and dried at a temperature of from about 200° to about 500° F. Drying is preferably by spray-drying techniques whereby the silica-alumina is recovered as microspheres, admixed with a suitable binding agent, such as graphite, polyvinyl alcohol, etc., and extruded or otherwise compressed into pills or pellets of uniform size and shape.

The silica-alumina is suitably employed in the form of macrospheres such as are prepared by the well-known oil-drop method. For example, an alumina sol, utilized as an alumina source, is commingled with an acidified water glass solution as a silica source, and the mixture further commingled with a suitable gelling agent, for example, urea, hexamethylenetetramine, or mixtures thereof. The mixture is discharged while still below gellation temperature, and by means of a nozzle or rotating disk, into a hot oil bath maintained at gellation temperature. The mixture is dispersed into the oil bath as droplets which form into spheriodal gel particles during passage therethrough. The alumina sol is generally prepared by conventional methods. For example, aluminum pellets are commingled with a quantity of treated or deionized water, with hydrochloric acid being added thereto in sufficient amount to digest a portion of the aluminum metal and form the desired sol. A suitable reaction rate is effected at about reflux temperature of the mixture.

The spheroidal gel particles prepared by the oil-drop method are aged, usually in the oil bath, for a period of at least 10 hours, and then in a suitable alkaline or basic medium for at least another 10 hours, and finally water-washed. Proper gellation of the mixture in the oil bath, as well as subsequent aging of the gel spheres, is not readily accomplished below about 120° F., and above 210° F. the rapid evolution of the gases tends to rupture and otherwise weaken the spheres. By maintaining sufficient superatmospheric pressure during the forming and aging steps in order to maintain water in the liquid phase, the high temperature can be employed, frequently with improved results.

The spheres are water-washed, preferably with water containing a small amount of ammonium hydroxide and/or ammonium nitrate. After washing, the spheres are dried at a temperature of from about 200° F. to about 600° F. for a period of from about 6 to about 24 hours or more, and then calcined at a temperature of from about 800° to about 1400° F. for a period of from about 2 to about 12 hours or more.

The platinum group metallic component is composited with the silica-alumina carrier material in any suitable manner. Thus, the carrier material can be soaked, dipped, suspended, or otherwise immersed in an aqueous impregnating solution containing a soluble platinum group metal compound. One suitable method comprises immersing the carrier material in the impregnating solution and evaporating the same to dryness in a rotary steam dryer, the concentration of the impregnating solution being such as to insure a final catalyst composite comprising from about 0.1 to about 5.0 wt. percent platinum group metal. Suitable platinum group metal compounds include platinum chloride, chloroplatinic acid, palladium chloride, chloropalladic acid, and the like.

The catalyst composite is usually dried at a temperature of from about 200° to about 400° F. for a period of from about 1 to about 10 hours prior to calcination. In accordance with the present invention, calcination is effected in an oxidizing atmosphere at a temperature of from about 750° to about 850° F. The oxidizing atmosphere is suitably air, although other gases comprising molecular oxygen may be employed. As heretofore mentioned, calcination at a temperature in excess of about 850° F. results in a considerable degree of agglomeration of the platinum, or other platinum group metallic component, on the silica-alumina surface in a crystallite size in excess of about 40 angstroms, a phenomenon that is not evident when the carrier material is, for example, alumina. Calcination at a temperature below about 750° F. in an oxidizing atmosphere apparently leaves sufficient moisture in chemical and/or physical combination with the catalyst to effect agglomeration of the platinum group metallic component during subsequent reduction treatment. Further, it has been observed that once the catalyst composite has been calcined in an oxidizing atmosphere at a temperature outside of the stated range, the platinum group metallic component is not effectively redistributed on the carrier surface in a crystallite size of less than about 40 angstroms by subsequent treatment in an oxidizing atmosphere at a temperature in the stated range. By utilizing the calcining technique of this invention, the platinum group metallic component is dispersed on the silica-alumina surface in a crystallite size of less than about 20 angstroms, and more frequently, in a crystallite size substantially equivalent to an atomically dispersed platinum group metallic component.

Following the high temperature oxidation procedure the catalyst is usually reduced for a period of from about ½ to about 1 hour at a temperature in the range of from about 700° F. to about 1000° F. in the presence of hydrogen. The catalyst may be used in a sulfided form. Thus after reduction, the catalyst may be subjected to sulfidation by passing hydrogen sulfide, or other suitable sulfur containing compound, in contact therewith, preferably at an elevated temperature of from about 500° to about 1100° F. When the petroleum hydrocarbon to be hydrocracked contains sulfur compounds, by design or otherwise, sulfidation may be suitably effected in situ in the initial stages of the hydrocracking process.

The catalyst composite, prepared in accordance with the method of this invention, is preferably employed in a reaction zone as a fixed bed. The hydrocarbon charge stock after being combined with hydrogen in an amount of from about 2000 to about 20,000 standard cubic feet per barrel, and preferably at least about 5000 standard cubic feet per barrel, is introduced into the reaction zone. The charge stock may be in a liquid vapor, or liquid-vapor phase mixture, depending upon the temperature, pressure, proportion of hydrogen and the boiling range of the charge stock being processed. The liquid hourly space velocity through the reaction zone will be in excess of about 0.2 and generally in the range of from about 1.0 to about 15.0. The source of hydrogen being admixed with a hydrocarbon charge stock may comprise high-pressure, low-temperature separation zone from which a hydrogen-rich gas stream is withdrawn and recycled to supply at least a portion of such hydrogen. Excess hydrogen resulting from the various dehydrogenation reactions effected in a catalytic reforming unit may be employed in admixture with the hydrocarbon charge. The reaction zone will operate under an imposed pressure within the range of from about 80 to about 3000 pounds per square inch gauge. The catalyst bed inlet temperature is maintained within the range of from about 350° to about 800° F. Since the hydrocracking reactions are exothermic, the outlet temperature or the temperature at the bottom of the catalyst bed will be significantly higher than that at the inlet thereto. The degree of exothermicity exhibited by the temperature rise across the catalyst bed is at least partially dependent upon the character of the charge stock passing therethrough, the rate at which the normally liquid hydrocarbon charge contacts the catalyst bed, the intended degree of conversion to lower-boiling-hydrocarbon products, etc. In any event, the catalyst bed inlet temperature will be such that the exothermicity of the reactions taking place does not cause the temperature at the outlet of the bed to exceed about 900° F., and preferably 850° F. The operation may also be effected as a moving-bed type, or suspensoid type of operation in which the catalyst, hydrocarbon and hydrogen are admixed and pass as a slurry through the reaction zone.

Although the method of preparing the catalyst, and careful selection of operating conditions within the ranges hereinbefore set forth, extend the effective life of the catalyst composite, regeneration thereof may eventually become desired due to the natural deterioration of the catalytically active metallic components. The catalytic composite is readily regenerated by treating the same in an oxidizing atmosphere, at a temperature of from about 750° to about 850° F., and burning coke and other heavy hydrocarbonaceous material therefrom. The catalyst composite may then be subjected to the reducing action of hydrogen, in situ, at a temperature within the range of from about 1000° to about 1200° F.

The following example is presented in illustration of the catalyst of this invention and a method of preparation thereof, and is not intended as an undue limitation on the generally broad scope of the invention as set out in the appended claims.

This example describes the preparation of a catalyst comprising 0.375 wt. percent platinum composited with a silica-alumina carrier material consisting of 75 wt. percent silica and 25 wt. percent alumina. In the preparation of the carrier material, 1610 grams of water glass (28 wt. percent silica) is diluted with 3220 cubic centimeters of water, acidified with 400 cubic centimeters of concentrated hydrochloric acid, and further diluted with 800 cubic centimeters of water. The resulting silica sol is then admixed with about 1580 cubic centimeters of an aqueous aluminum sulfate solution having a specific gravity of 1.28. A silica-alumina hydrogel is then precipitated from the sol by the addition with stirring of an ammoniacal solution consisting of 640 cubic centimeters of an aqueous 28 wt. percent ammonium hydroxide solution diluted to 1280 cubic centimeters with water. The hydrogel is recovered by filtration, water-washed free of residual sulfate ions, reslurried in water and spray dried. The spray dried microspheres are then compressed into the pellets and calcined in air for about 3 hours at 1200° F. An impregnating solution is then prepared by dissolving a requisite quantity of chloroplatinic acid in water, and further diluting this solution to about 250 cubic centimeters with water. A 200 gram portion of the silica-alumina pellets is then immersed in the solution in a rotating steam dryer and the solution evaporated to dryness.

The platinum-impregnated silica-alumina catalyst was divided into separate portions, the first being subjected to calcination in air at a temperature of 1000° F. for 1 hour and designated as catalyst A. The second portion was subjected to calcination in air at a temperature of 825° F. for a period of 3 hours and designated as catalyst B. The two catalyst portions were analyzed by X-ray diffraction techniques and by carbon monoxide adsorption techniques. By the former technique, platinum crystallite sizes in excess of about 25 angstrom units are detectable. Platinum crystallite sizes, including sizes of less than about 25 angstrom units, are detectable by the latter technique. In the carbon monoxide adsorption technique, the platinum crystallites available for carbon monoxide adsorption (i.e., reaction) is determined and expressed as a carbon monoxide/platinum mole ratio. Thus, where the platinum is in a substantially atomically dispersed state, the CO/Pt mole ratio approaches 1.0.

On catalyst A, calcined in air at 1000° F., about 50% of the platinum was detectable by X-ray diffraction which indicated the average crystallite size thereof to be about 40 angstrom units. The CO/Pt mole ratio in the carbon monoxid adsorption analysis was 0.7. This finding is indicative of an overall average crystallite size of about 15 angstrom units.

On catalyst B, calcined in air at 825° F., none of the platinum was detectable by X-ray diffraction techniques. However, carbon monoxide adsorption on catalyst B gave a CO/Pt mole ratio of 0.90. This finding is indicative of an average platinum crystallite size of less than about 10 angstrom units, and of a substantially atomically dispersed platinum on the catalyst surface.

I claim as my invention:

1. A catalyst composition comprising a platinum group metal component composited with a silica-alumina carrier material and prepared by the method which comprises compositing at least one platinum group metal component with a silica-alumina carrier material and calcining the composite in an oxidizing atmosphere at a temperature of from about 750° to about 850° F. while avoiding temperatures in excess of 850° F., and recovering a catalyst composite comprising said metal component dispersed on said carrier material in a crystallite size of less than about 20 angstroms.

2. The catalyst composition of claim 1 further characterized in that said platinum group metal is platinum.

3. The catalyst composition of claim 1 further characterized in that said platinum group metal is palladium.

4. The catalyst composition of claim 1 further characterized in that said catalyst composition is further treated in a reducing atmosphere at a temperature of from about 1000° to about 1200° F.

References Cited

UNITED STATES PATENTS

| | | | |
|---|---|---|---|
| 3,013,980 | 12/1961 | Carr et al. | 252—416 |
| 3,203,889 | 8/1965 | Pollitzer et al. | 208—111 X |
| 3,216,922 | 11/1965 | O'Hara | 208—111 |
| 3,222,271 | 12/1965 | McClellan | 208—111 X |
| 3,534,110 | 10/1970 | Juquin et al. | 252—459 X |
| 3,558,525 | 1/1971 | Noble | 252—459 X |

CARL F. DEES, Primary Examiner

U.S. Cl. X.R.

252—460